(12) United States Patent
Lilly et al.

(10) Patent No.: US 9,043,554 B2
(45) Date of Patent: May 26, 2015

(54) CACHE POLICIES FOR UNCACHEABLE MEMORY REQUESTS

(71) Applicant: Apple Inc., Cupertino, CA (US)

(72) Inventors: Brian P. Lilly, San Francisco, CA (US); Gerard R. Williams, III, Los Altos, CA (US); Perumal R. Subramoniam, San Jose, CA (US); Pradeep Kanapathipillai, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 213 days.

(21) Appl. No.: 13/725,066

(22) Filed: Dec. 21, 2012

(65) Prior Publication Data

US 2014/0181403 A1 Jun. 26, 2014

(51) Int. Cl.
*G06F 12/08* (2006.01)

(52) U.S. Cl.
CPC ........ *G06F 12/0811* (2013.01); *G06F 12/0888* (2013.01); *G06F 12/0815* (2013.01)

(58) Field of Classification Search
CPC ............ G06F 12/0815; G06F 12/0811; G06F 12/0888
USPC ................................................ 711/122, 141
See application file for complete search history.

(56) References Cited

U.S. PATENT DOCUMENTS

| | | | |
|---|---|---|---|
| 5,481,691 A | 1/1996 | Day, III et al. | |
| 5,553,268 A * | 9/1996 | Willenz et al. | 711/158 |
| 5,715,427 A | 2/1998 | Barrera et al. | |
| 5,915,262 A * | 6/1999 | Bridgers et al. | 711/143 |
| 6,122,715 A * | 9/2000 | Palanca et al. | 711/154 |
| 6,393,525 B1 | 5/2002 | Wilkerson et al. | |
| 6,493,797 B1 | 12/2002 | Lee et al. | |
| 6,931,493 B2 | 8/2005 | Johns et al. | |
| 7,260,679 B2 | 8/2007 | Benhase et al. | |
| 7,330,935 B2 | 2/2008 | Yamazaki | |
| 8,392,658 B2 | 3/2013 | Wang et al. | |
| 2003/0225976 A1 | 12/2003 | Hokenek et al. | |
| 2004/0059875 A1 | 3/2004 | Garg et al. | |
| 2006/0268592 A1 * | 11/2006 | Mohammad et al. | 365/49 |

* cited by examiner

*Primary Examiner* — Than Nguyen
(74) *Attorney, Agent, or Firm* — Rory D. Rankin; Meyertons, Hood, Kivlin, Kowert & Goetzel, P.C.

(57) ABSTRACT

Systems, processors, and methods for keeping uncacheable data coherent. A processor includes a multi-level cache hierarchy, and uncacheable load memory operations can be cached at any level of the cache hierarchy. If an uncacheable load misses in the L2 cache, then allocation of the uncacheable load will be restricted to a subset of the ways of the L2 cache. If an uncacheable store memory operation hits in the L1 cache, then the hit cache line can be updated with the data from the memory operation. If the uncacheable store misses in the L1 cache, then the uncacheable store is sent to a core interface unit. Multiple contiguous store misses are merged into larger blocks of data in the core interface unit before being sent to the L2 cache.

20 Claims, 9 Drawing Sheets

Table 70

| Memory Attribute |
|---|
| Normal, Cacheable (WB-WA) |
| Normal, Uncacheable |
| Device |

Table 72

| Memory Attribute | Maps To |
|---|---|
| Normal, Cacheable (WB-WA) | Normal, Cacheable (WB-WA) |
| Normal, Cacheable (WB-nWA) | Normal, Cacheable (WB-WA) |
| Normal, Cacheable (WT) | Normal, Uncacheable |
| Normal, Uncacheable | Normal, Uncacheable |
| Device, Uncacheable | Device |

CACHE POLICIES FOR UNCACHEABLE MEMORY REQUESTS

BACKGROUND

1. Field of the Invention

The present invention relates generally to processors, and in particular to methods and mechanisms for processing uncacheable memory requests.

2. Description of the Related Art

Integrated circuits (ICs) often include multiple circuits or agents that have a need to communicate with each other and/or access data stored in memory. In many cases, agents may communicate through various addresses defined in a common memory map or address space. In a typical IC, the address space of the IC may be split up into multiple different regions, including a cacheable region and an uncacheable region. Requests with addresses that fall within the cacheable region are eligible to be cached within the IC, while requests with addresses that fall within the uncacheable region are not expected to be cached within the IC.

A processor of the IC may be configured to execute various types of memory operations that target both the cacheable and uncacheable regions. The processor may include a memory system with multiple levels of caches for providing low latency access to instructions and data, and memory requests that reference the cacheable regions of the address space may typically be stored at any level of cache without restrictions. However, it is often difficult for processors to maintain coherency throughout the memory system for memory requests that reference the uncacheable regions of the address space.

In multiprocessor ICs, and even in single processor ICs in which other devices access main memory but do not access a given cache, the issue of cache coherence arises. That is, a given data producer can write a copy of data in the cache, and the update to main memory's copy is delayed. In write-through caches, a write operation is dispatched to memory in response to the write to the cache line, but the write is delayed in time. In a writeback cache, writes are made in the cache and not reflected in memory until the updated cache block is replaced in the cache (and is written back to main memory in response to the replacement).

Because the updates have not been made to main memory at the time the updates are made in cache, a given data consumer can read the copy of data in main memory and obtain "stale" data (data that has not yet been updated). A cached copy in a cache other than the one to which a data producer is coupled can also have stale data. Additionally, if multiple data producers are writing the same memory locations, different data consumers could observe the writes in different orders.

Cache coherence solves these problems by ensuring that various copies of the same data (from the same memory location) can be maintained while avoiding "stale data", and by establishing a "global" order of reads/writes to the memory locations by different producers/consumers. If a read follows a write in the global order, the data read reflects the write. Typically, caches will track a state of their copies according to the coherence scheme. For example, the popular Modified, Exclusive, Shared, Invalid (MESI) scheme includes a modified state (the copy is modified with respect to main memory and other copies); an exclusive state (the copy is the only copy other than main memory); a shared state (there may be one or more other copies besides the main memory copy); and the invalid state (the copy is not valid). The MOESI scheme adds an Owned state in which the cache is responsible for providing the data for a request (either by writing back to main memory before the data is provided to the requestor, or by directly providing the data to the requester), but there may be other copies in other caches. Maintaining cache coherency is increasingly challenging as various different types of memory requests referencing uncacheable and cacheable regions of the address space are processed by the processor(s).

It is noted that throughout this disclosure, memory requests that reference the uncacheable region of the address space may be referred to as "uncacheable memory requests". Memory requests may also be referred to as "transactions", "memory access operations", or "memory operations", which are a type of instruction operation. In various embodiments, memory operations may be implicitly specified by an instruction having a memory operation, or may be derived from explicit load/store instructions. Furthermore, a "load memory operation" or "load operation" may refer to a transfer of data from memory or cache to a processor, and a "store memory operation" or "store operation" may refer to a transfer of data from a processor to memory or cache. "Load operations" and "store operations" may be more succinctly referred to herein as "loads" and "stores", respectively.

Furthermore, a load may be referred to as a "cacheable load" if the load addresses a cacheable region of the address space or an "uncacheable load" if the load addresses an uncacheable regions of the address space. Similarly, a store may be referred to as a "cacheable store" if the store addresses a cacheable region of the address space or an "uncacheable store" if the store addresses an uncacheable region of the address space.

It is also noted that the terms "uncacheable", "non-cacheable", "uncached" may be used interchangeably throughout this disclosure. Similarly, the terms "cacheable" and "cached" may be used interchangeably throughout this disclosure.

SUMMARY

Apparatuses, processors, and methods for keeping uncacheable data coherent with cacheable data are disclosed.

In one embodiment, the processor may include an address space that is divided into memory space and device space. The memory space may be partitioned into cacheable and uncacheable space. The processor may include a multi-level cache hierarchy for providing low latency access to data. The processor may be configured to keep data from uncacheable loads and uncacheable stores coherent with the data stored in the cache hierarchy.

In one embodiment, uncacheable loads may be cached at any level of the cache hierarchy. In a level two (L2) cache, the uncacheable loads may be restricted to a portion of the ways of the L2 cache. In one embodiment, the L2 cache may include eight ways, and uncacheable loads may be restricted to two ways of the L2 cache. Uncacheable stores may be treated as write-through, no-write-allocate by a level one (L1) cache. Uncacheable stores that miss in the L1 cache may be gathered in buffers in a core interface unit (CIF) and written to the L2 cache when a buffer contains a full cache line of data.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A processor comprising a core interface unit . . . ." Such a claim does not foreclose the processor from including additional components (e.g., a load/store unit, an execution unit). "Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 1:
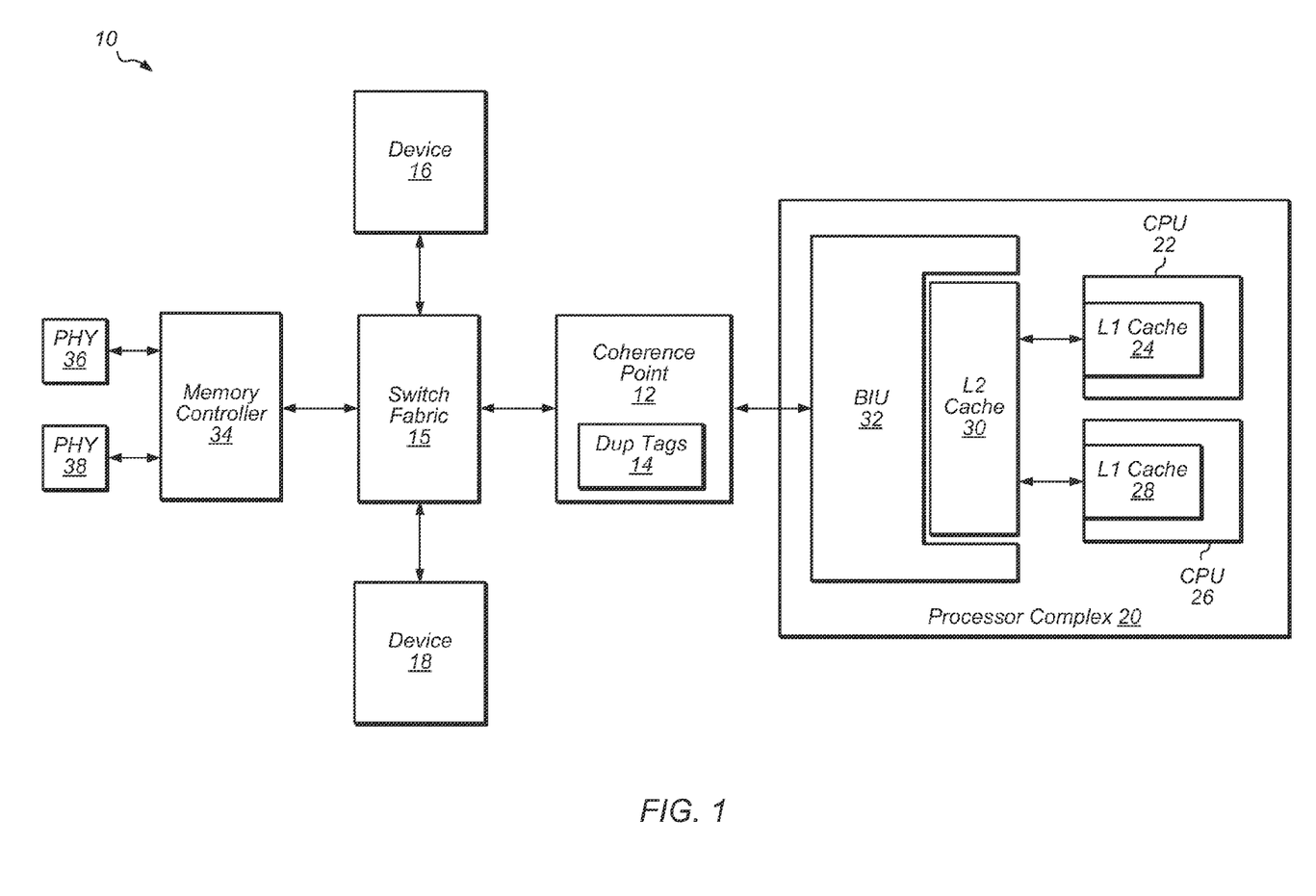
FIG. 1 is a block diagram that illustrates one embodiment of a portion of an integrated circuit.

Referring now to FIG. 1, a block diagram illustrating one embodiment of a portion of an integrated circuit (IC) is shown. In the illustrated embodiment, IC 10 includes processor complex 20, coherence point 12, switch fabric 15, devices 16 and 18, memory controller 34, and memory physical interface circuits (PHYs) 36 and 38. It is noted that IC 10 may also include many other components not shown in FIG. 1. In various embodiments, IC 10 may also be referred to as a system on chip (SoC), an application specific integrated circuit (ASIC), or an apparatus.

Processor complex 20 may include central processing units (CPUs) 22 and 26, level two (L2) cache 30, and bus interface unit (BIU) 32. In other embodiments, processor complex 20 may include other numbers of CPUs. CPUs 22 and 26 may also be referred to as processors or cores. It is noted that processor complex 20 may also include other components not shown in FIG. 1.

The CPUs 22 and 26 may include circuitry to execute instructions defined in an instruction set architecture. Specifically, one or more programs comprising the instructions may be executed by CPUs 22 and 26. Any instruction set architecture may be implemented in various embodiments. For example, in one embodiment, the ARM™ instruction set architecture (ISA) may be implemented. The ARM instruction set may include 16-bit (or Thumb) and 32-bit instructions. Other exemplary ISA's may include the PowerPC™ instruction set, the MIPS™ instruction set, the SPARC™ instruction set, the x86 instruction set (also referred to as IA-32), the IA-64 instruction set, etc.

CPU 22 may include level one (L1) cache 24 and CPU 26 may include L1 cache 28, and L1 caches 24 and 28 may be coupled to L2 cache 30. Other embodiments may include additional levels of cache (e.g., level three (L3) cache). L1 caches 24 and 28 and L2 cache 30 may comprise any capacity and configuration (e.g. direct mapped, set associative). L2 cache 30 may be coupled to memory controller 34 via BIU 32, coherence point 12, and switch fabric 15. BIU 32 may include various logic structures to couple CPUs 22 and 26 and L2 cache 30 to various other devices and blocks.

Coherence point 12 may be configured to act as a gateway between the coherent and non-coherent domains in IC 10. Coherence point 12 may be the location in IC 10 where memory operations become globally visible. Coherence point 12 may also include L2 duplicate tags 14, which are tags from L2 cache 30 for all coherent agents in IC 10 and which may be snooped by coherence point 12 for coherency operations. Coherence point 12 may also include additional logic (e.g., coherence control unit, memory interface unit, current transaction table) not shown in FIG. 1. For example, in various embodiments, coherence point 12 may include cache coherency logic employing a cache coherency protocol to ensure data accessed by each agent is kept up to date. An example of a cache coherency protocol includes the MOESI protocol with the Modified (M), Owned (O), Exclusive (E), Shared (S), and Invalid (I) states. Coherence point 12 may be coupled to switch fabric 15, and coherence point 12 may be coupled to devices 16 and 18 via switch fabric 15. Devices 16 and 18 are representative of any number and type of devices within IC 10. In another embodiment, coherence point 12 and switch fabric 15 may be integrated within a single coherence controller.

Devices 16 and 18 may generally be any type of peripheral device or interface, implementing any hardware functionality included in the system other than the CPUs. For example, the devices 16 and 18 may include video peripherals such as cameras, camera interfaces, image processors, video encoders/decoders, scalers, rotators, blenders, graphics processing units, display controllers, etc. The devices 16 and 18 may include audio peripherals such as microphones, speakers, interfaces to microphones and speakers, audio processors, digital signal processors, mixers, etc. The devices 16 and 18 may include interface controllers for various interfaces external to IC 10, including interfaces such as Universal Serial Bus (USB), peripheral component interconnect (PCI) including PCI Express (PCIe), serial and parallel ports, etc. The devices 16 and 18 may include networking peripherals such as media access controllers (MACs). It is noted that in some embodiments, one or more of devices 16 and 18 may be external to IC 10.

Memory controller 34 may include any number of memory ports and may include circuitry configured to interface to memory. For example, memory controller 34 may be configured to interface to dynamic random access memory (DRAM) such as synchronous DRAM (SDRAM) (including mobile versions of the SDRAMs such as mDDR3, etc., and/or low power versions of the SDRAMs such as LPDDR2, etc.), RAMBUS DRAM (RDRAM), double data rate (DDR) SDRAM, DDR2 SDRAM, Rambus DRAM (RDRAM), static RAM (SRAM), etc. Memory controller 34 may also be coupled to memory physical interface circuits (PHYs) 36 and 38. Memory PHYs 36 and 38 are representative of any number of memory PHYs which may be coupled to memory controller 34. Memory PHYs 36 and 38 may be configured to interface to memory devices (not shown). Memory PHYs 36 and 38 may handle the low-level physical interface to the memory devices. For example, the memory PHYs 36 and 38 may be responsible for the timing of the signals, for proper clocking to synchronous DRAM memory, etc.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown. In addition, in other embodiments, the connections between components of IC 10 may differ from those shown in FIG. 1. In other words, direct connections between components may be used for components that are not directly connected in FIG. 1, and components with direct connections in FIG. 1 may instead connect via one or more other components.

Figure 2:
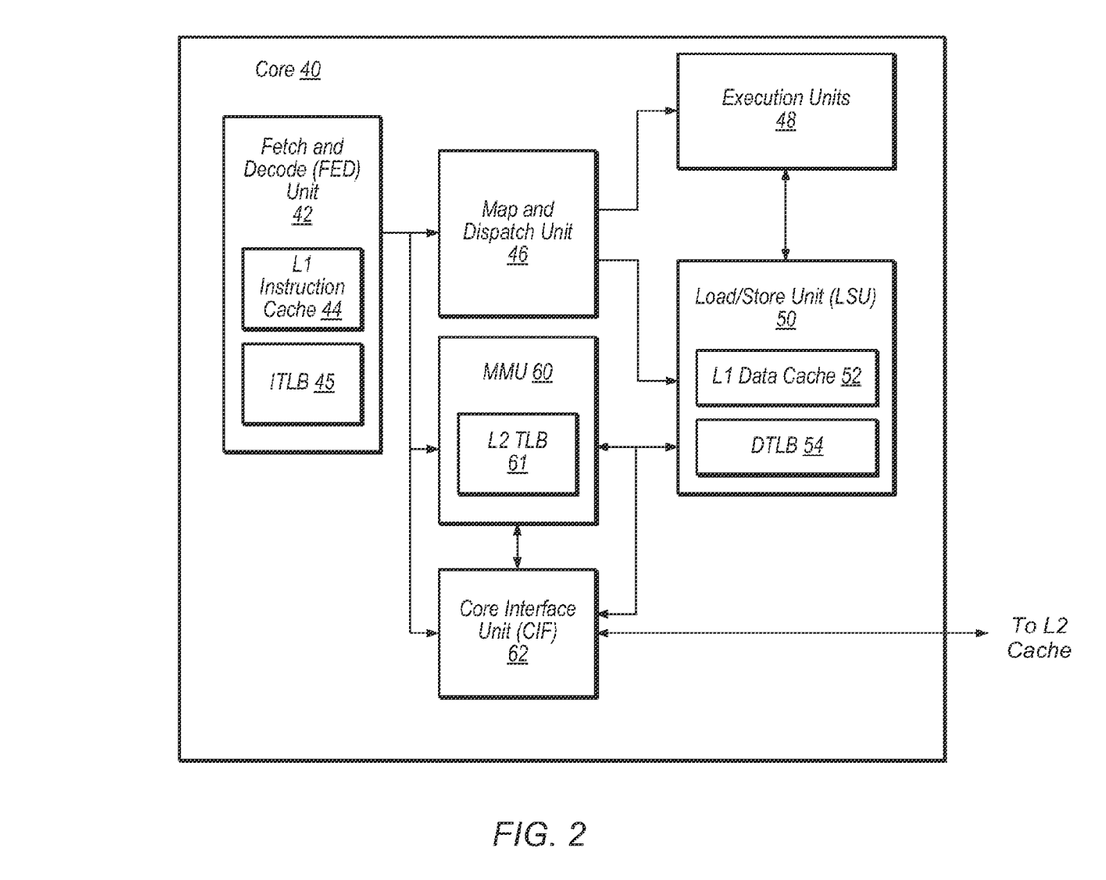
FIG. 2 is a block diagram that illustrates one embodiment of a processor core.

Turning now to FIG. 2, one embodiment of a processor core is shown. Core 40 is one example of a processor core, and core 40 may be utilized within a processor complex, such as processor complex 20 of FIG. 2. In one embodiment, each of CPUs 22 and 26 of FIG. 2 may include the components and functionality of core 40. Core 40 may include fetch and decode (FED) unit 42, map and dispatch unit 46, execution units 48, load/store unit (LSU) 50, memory management unit (MMU) 60, and core interface unit (CIF) 62. It is noted that core 40 may include other components not shown in FIG. 2.

FED unit 42 may include circuitry configured to read instructions from memory and place them in level one (L1) instruction cache 44. L1 instruction cache 44 may be a cache memory for storing instructions to be executed by core 40. L1 instruction cache 44 may have any capacity and construction (e.g. direct mapped, set associative, fully associative, etc.). Furthermore, L1 instruction cache 44 may have any cache line size. FED unit 42 may also include instruction translation lookaside buffer (ITLB) 45 for storing a subset of the page table. The page table, comprising one or more page table entries, translates virtual addresses into physical addresses used to access memory. FED unit 42 may also include branch prediction hardware configured to predict branch instructions and to fetch down the predicted path. FED unit 42 may also be redirected (e.g. via misprediction, exception, interrupt, flush, etc.).

In one embodiment, L1 instruction cache 44 may store uncacheable data. In one embodiment, L1 instruction cache 44 may retrieve a memory attribute for a given address from a page table entry stored in ITLB 45 to determine if the given address is uncacheable or cacheable. In some cases, if the page table entry indicates that the given address has an uncacheable memory attribute, L1 instruction cache 44 may ignore this uncacheable memory attribute and store the data for the given address in L1 instruction cache 44. Since the L1 instruction cache 44 treats uncacheable data as cacheable, this may result in an accelerated boot time and reduced energy consumption during boot, when instructions from the boot read-only memory (ROM) (not shown) are usually marked as uncacheable.

FED unit 42 may also be configured to decode instructions into instruction operations. In addition, FED unit 42 may also be configured to decode multiple instructions in parallel. Generally, an instruction operation may be an operation that the hardware included in execution units 48 and LSU 50 is capable of executing. Each instruction may translate to one or more instruction operations which, when executed, result in the performance of the operations defined for that instruction according to the instruction set architecture. It is noted that the terms "operation", "instruction operation", and "uop" may be used interchangeably throughout this disclosure. In other embodiments, the functionality included within FED unit 42 may be split into two or more separate units, such as a fetch unit, a decode unit, and/or other units.

Decoded uops may be provided to map/dispatch unit 46. Map/dispatch unit 46 may be configured to map uops and architectural registers to physical registers of core 40. Map/dispatch unit 46 may implement register renaming to map source register addresses from the uops to the source operand numbers identifying the renamed source registers. Map/dispatch unit 46 may also be configured to dispatch uops to reservation stations within execution units 48 and LSU 50. Map/dispatch unit 46 may also include components (e.g., reorder buffer, mapper array, dispatch unit, dispatch buffer) not shown in FIG. 2. Furthermore, in other embodiments, the functionality included within map/dispatch unit 46 may be split into two or more separate units, such as a map unit, a dispatch unit, and/or other units.

LSU 50 may include L1 data cache 52 and data TLB (DTLB) 54. LSU 50 may also be coupled to the L2 cache via CIF 62. It is noted that LSU 50 may also include other logic (e.g., reservation stations, load queue, store queue, prefetch unit) not shown in FIG. 2. Load and store operations may be dispatched from map/dispatch unit 46 to reservation stations in LSU 50.

Execution units 48 may include any number and type of execution units (e.g., integer, floating point, vector). Each of execution units 48 may also include one or more reservation stations (not shown). MMU 60 may include L2 TLB 61 and may be configured to perform address translation and memory management functions. CIF 62 may be coupled to LSU 50, FED unit 42, MMU 60, and an L2 cache (not shown). CIF 62 may be configured to manage the interface between core 40 and the L2 cache for memory requests that miss in either L1 cache.

CIF 62 may also include a plurality of buffers (not shown) for storing uncacheable stores that miss in L1 data cache 52. As used herein, the term "uncacheable store" may be defined as a store memory operation that references an address in the uncacheable region of the address space. Similarly, the term "uncacheable load" may be defined as a load memory operation that references an address in the uncacheable region of the address space.

In one embodiment, when an uncacheable store misses in the L1 data cache 52, the uncacheable store may be sent to a buffer in CIF 62, and CIF 62 may combine multiple uncacheable stores together into larger blocks of data. The buffer may hold several bytes of data in contiguous memory locations. When the data in the buffer has reached the size of a cache line block, then CIF 62 may send the data to the L2 cache in a single write operation. The cache line may be the unit of allocation and deallocation in the L2 cache and the cache line may be any of various sizes, depending on the embodiment. This policy has the effect of reducing the bandwidth between CIF 62 and the L2 cache by combining multiple uncacheable store misses into a single block of data. Once CIF 62 gets a full cache line of contiguous data, the buffer may be closed down and then the full cache line of data may be conveyed to the L2 cache.

It should be understood that the distribution of functionality illustrated in FIG. 2 is not the only possible microarchitecture which may be utilized for a processor core. Other processor cores may include other components, omit one or more of the components shown, and/or include a different arrangement of functionality among the components.

Figure 3:
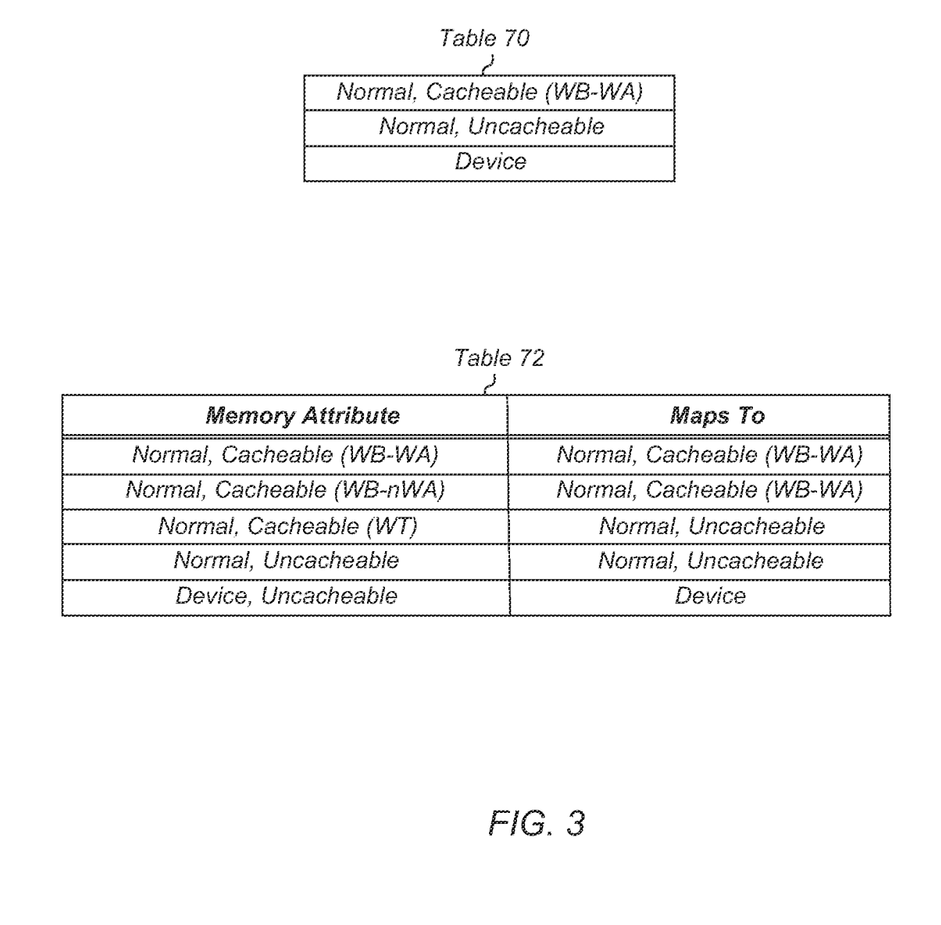
FIG. 3 illustrates one embodiment of two tables of memory attribute types.

Referring now to FIG. 3, one embodiment of two tables of memory attribute types is shown. Table 70 shows three different types of memory attributes that may be supported within an IC or SoC address space for one particular embodiment. In other embodiments, other types of memory attribute types and address spaces may be utilized. In one embodiment, the memory attribute types of table 70 may be encoded using any suitable encoding scheme and included in the page table entries. The memory attribute type may be retrieved from a page table entry when performing a virtual to physical address translation for a virtual address of a given memory request.

In one embodiment, the address space may be split up into two types of memory, device memory and normal memory. Device memory may be considered uncacheable memory. The normal memory section of the address space may be partitioned into cached and uncached regions. The cached region may utilize a write-back, write-allocate (WB-WA) cache policy. In one embodiment, any memory requests that are addressed to normal memory may be treated as coherent.

It is noted that the terms "cached" and "cacheable" may be used interchangeably through this disclosure. It is also noted that the terms "uncached" and "uncacheable" may be used interchangeably through this disclosure.

In one embodiment, a processor core within an IC or SoC may be designed based on the ARM architecture, and table 72 illustrates the mapping of ARM-defined memory attribute types to memory attribute types utilized within one particular processor core. It is noted that in other embodiments, other memory attribute types may be utilized and alternative mappings may be employed for these embodiments.

In table 72, the memory type specified in the ARM architecture and listed in the left column of table 72 may be remapped to the memory attribute types shown in the right column of table 72. For the first entry in table 72, the normal, WB-WA cacheable memory attribute type may remain unchanged by the mapping shown in table 72. The second entry, for normal memory with a write-back, no-write-allocate cache policy, may also be mapped to the normal, WB-WA cacheable memory attribute type. The third entry, for normal memory with a write-through (WT) cache policy, may be mapped to the normal, uncacheable memory attribute type.

The fourth entry of table 72 for normal, uncacheable memory attribute type may remain unchanged and be mapped to the normal, uncacheable memory attribute type. The fifth entry for device, uncacheable memory may be mapped to the device memory attribute type. In the embodiment illustrated by tables 70 and 72, the device portion of the address space may be treated as an uncacheable memory attribute type.

Figure 4:
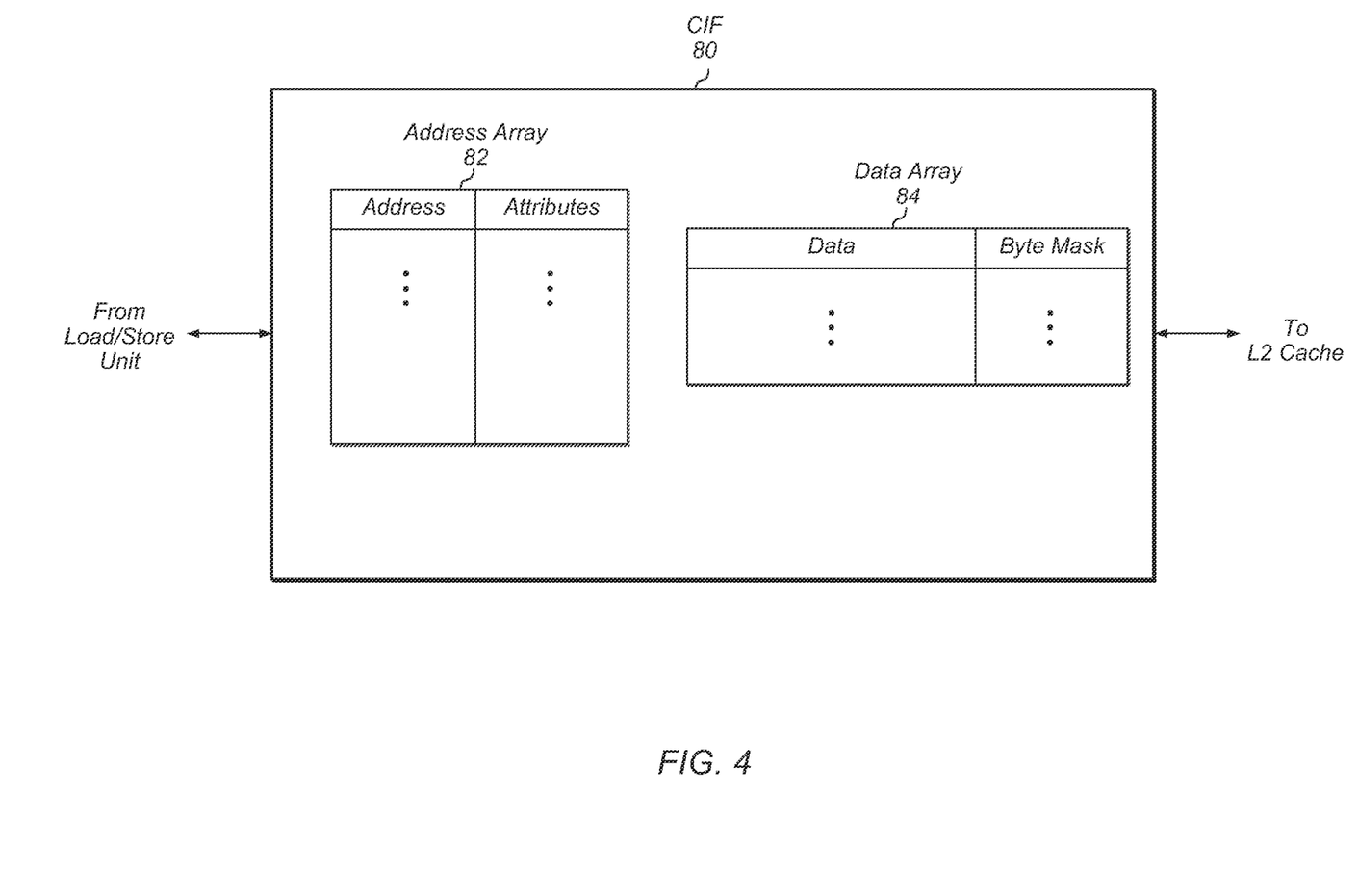
FIG. 4 is a block diagram that illustrates one embodiment of a core interface unit.

Turning now to FIG. 4, one embodiment of a core interface unit (CIF) is shown. CIF 80 may be coupled to a load/store unit (LSU) (not shown) and a L2 cache (not shown). CIF 80 may include address array 82 and data array 84. Depending on the embodiment, address array 82 and data array 84 may be separate units or may be combined into a single structure, such as a request queue. Although not shown in FIG. 4, CIF 80 may include one or more other units and/or logic (e.g., input arbiter, order matrix, request picker). For example, an order matrix may maintain an order of the requests received by CIF 80 and stored in address array 82 and data array 84.

Each entry of address array 82 may include the address of the corresponding request and associated attributes (e.g., L2 command, memory attribute, source of the request). For example, address queue 82 may store the addresses of any uncached stores that have been enqueued in data queue 84. Address queue 82 may also store addresses for other types of memory requests. In one embodiment, uncached stores may be treated as write-through, no-allocate by CIF 80. In some cases, the uncached stores may include less than a full cache line of data. The data from the uncached stores may be written to an entry in data array 84 and then the entry may remain open if the data is less than a full cache line. It is noted that an entry in data array 84 may also be referred to as a buffer.

Uncached stores that miss in the L1 data cache (not shown) in the LSU may be sent to CIF 80. Address queue 82 may be searched for a matching address for any newly received uncached stores. If the uncached store misses in the address queue 82, then a new entry may be created in address queue 82 and data queue 84 for the uncached store. If the uncached store hits in the address queue 82 and the data from the uncached store can be merged with the corresponding entry in data queue 84, then the data from the uncached store may be stored in the appropriate byte locations in the corresponding entry in data queue 84.

Data array 84 may be configured to store less than a full cache line of data per entry, and to receive data in smaller portions than a full cache line. Data array 84 may also be configured to receive multiple portions of data of the same cache line and to store the multiple portions in the appropriate locations of the respective entry. When an entry in data array 84 contains a full cache line, the data may be sent to the L2 cache and the entry may be closed.

Figure 5:
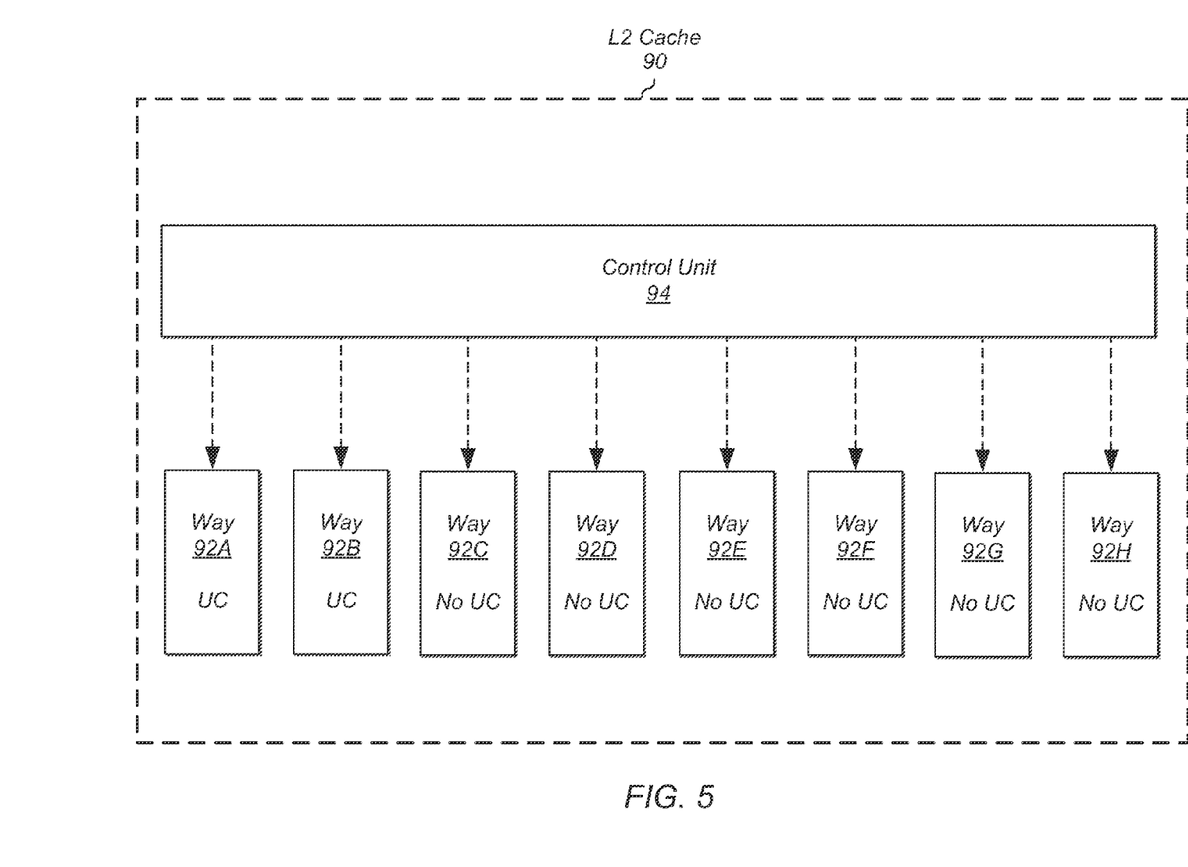
FIG. 5 is a block diagram that illustrates one embodiment of a L2 cache.

Referring now to FIG. 5, a block diagram of one embodiment of a L2 cache is shown. In one embodiment, L2 cache 90 may include control unit 94 and eight ways 92A-H. In other embodiments, L2 cache 90 may include other numbers of ways. For an uncacheable (UC) load that hits in L2 cache 90, the uncacheable load may update the hit cache line. For an uncacheable load that misses in L2 cache 90, allocation of the uncacheable load may be limited to only two ways 92A and 92B out of ways 92A-H. By limiting the number of ways that can store uncacheable loads, this limits the amount of thrashing that can be caused by the uncacheable loads. Additionally, by limiting the number of ways that can store uncacheable loads, the amount of cacheable data that is displaced from the cache is limited to only two ways to prevent large amounts of cacheable data from being evicted from L2 cache 90.

It is noted that limiting the allocation to two ways out of a total of eight ways is merely one example of a cache allocation scheme that may be utilized. In other embodiments, the L2 cache may have other numbers of ways, and the subset of ways to which uncacheable loads are allowed to be allocated may include more than or less than two ways. For example, in another embodiment, a L2 cache may have eight ways, and uncacheable loads may be restricted to one way.

In addition to limiting a subset of ways to uncacheable loads, other types of data may be limited to a subset of ways in a similar manner. For example, in some embodiments, prefetch data may be limited to a subset of ways in L2 cache 90. In one embodiment, prefetches may be limited to two ways of ways 92A-H of L2 cache 90. In this way, prefetches will be prevented from evicting large amounts of demand data stored in L2 cache 90.

Still further, L2 cache 90 may utilize a replacement policy that prioritizes replacing cache lines that are not stored in the L1 cache. In one embodiment, L2 cache 90 may be inclusive of the L1 cache, such that if a given cache line is present in the L1 cache, the given cache line will also be present in the L2 cache. Therefore, if the L2 cache 90 were to evict a first cache line that is also stored in the L1 cache, this will cause the first cache line to also be evicted from the L1 cache. This may cause data that is needed by the processor core to unnecessarily be evicted from the L1 cache, which will result in increased memory latency when the core requests this data. To prevent this scenario from occurring, the L2 cache may prioritize replacing data that is not stored in the L1 cache.

Figure 6:
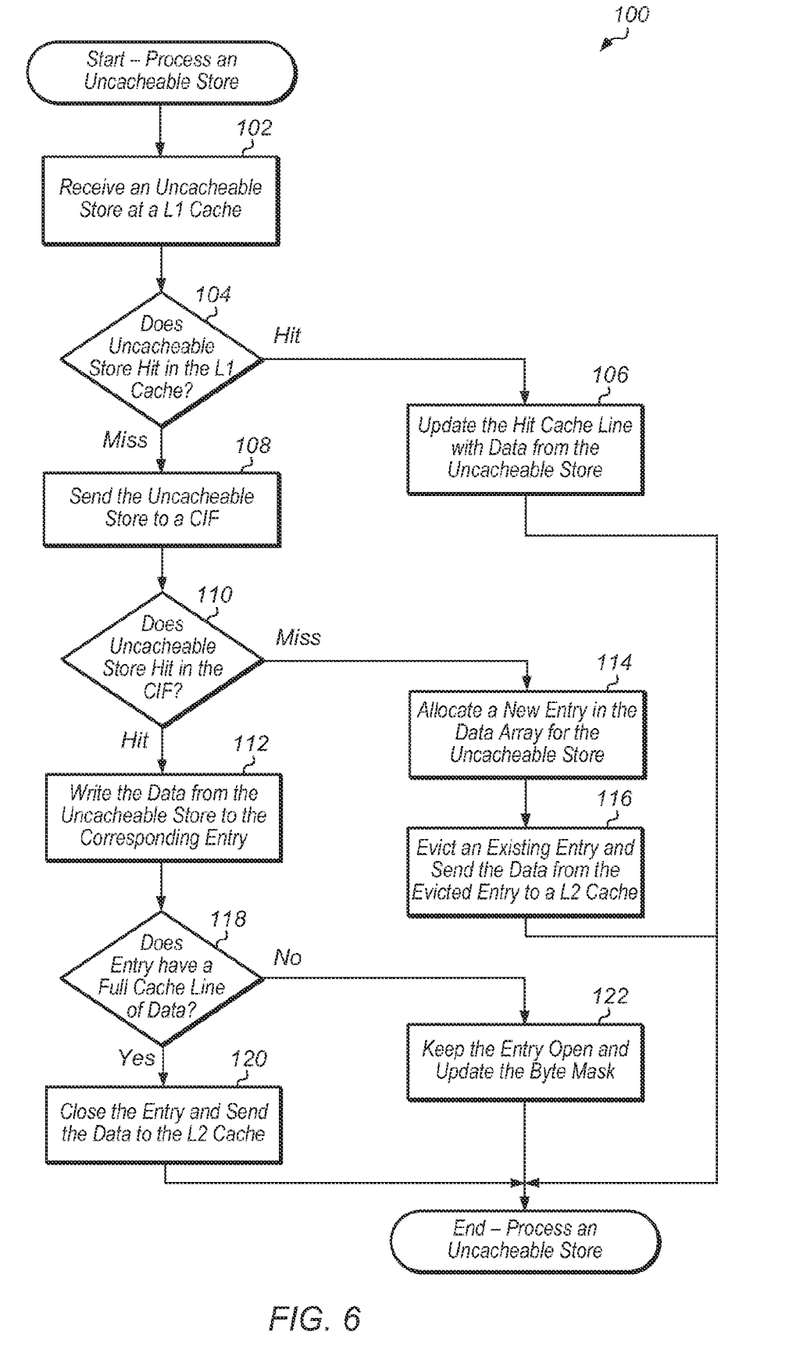
FIG. 6 is a generalized flow diagram illustrating one embodiment of a method for processing an uncacheable store.

Referring now to FIG. 6, one embodiment of a method 100 for processing an uncacheable store is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

An uncacheable store may be received at a L1 cache (block 102). In one embodiment, the L1 cache may be a L1 data cache located in a load/store unit. In other embodiments, the L1 cache may be located elsewhere within a processor core, and/or may store instructions in addition to data. Then, it may be determined if the uncacheable store hits in the L1 cache (conditional block 104). If the uncacheable store hits in the L1 cache (conditional block 104, "hit" leg), then the data from the uncacheable store may update the hit cache line in the L1 cache (block 106). After block 106, method 100 may end. In some cases, the uncacheable store may hazard against an outstanding load miss in the L1 cache. In these cases, the uncacheable store may wait until the outstanding load completes, at which point the uncacheable store may be restarted.

If the uncacheable store misses in the L1 cache (conditional block 104, "miss" leg), then the uncacheable store may be sent to a core interface unit (CIF) (block 108). Then, a lookup of the address array of the CIF may be performed to determine if partial data from the same cache line referenced by the uncacheable store is already stored in the CIF (conditional block 110). If the lookup of the address array of the CIF results in a hit (conditional block 110, "hit" leg), then the data from the uncacheable store may be written to the corresponding entry in the data array of the CIF (block 112). If the lookup of the address array of the CIF results in a miss (conditional block 110, "miss" leg), then a new entry may be allocated in the data array, and the data from the uncacheable store may be written to the newly allocated entry in the data array of the CIF (block 114). In some cases, an existing entry may be evicted from the data array to accommodate the newly allocated entry, and the data from the existing entry may be conveyed to the L2 cache (block 116). Alternatively, if the data array is full, the uncacheable store may wait until an entry becomes available. After block 116, method 100 may end.

After block 112, if the entry utilized for storing the data from the uncacheable store contains a full cache line of data (conditional block 118, "yes" leg), then the entry may be closed and data sent to the L2 cache (block 120). If the entry utilized for storing the data from the uncacheable store contains less than a full cache line of data (conditional block 116, "no" leg), then the entry may remain open and the byte mask of the entry may be updated to indicate which bytes of the entry were populated by the uncacheable store (block 122). After blocks 120 and 122, method 100 may end.

Figure 7:
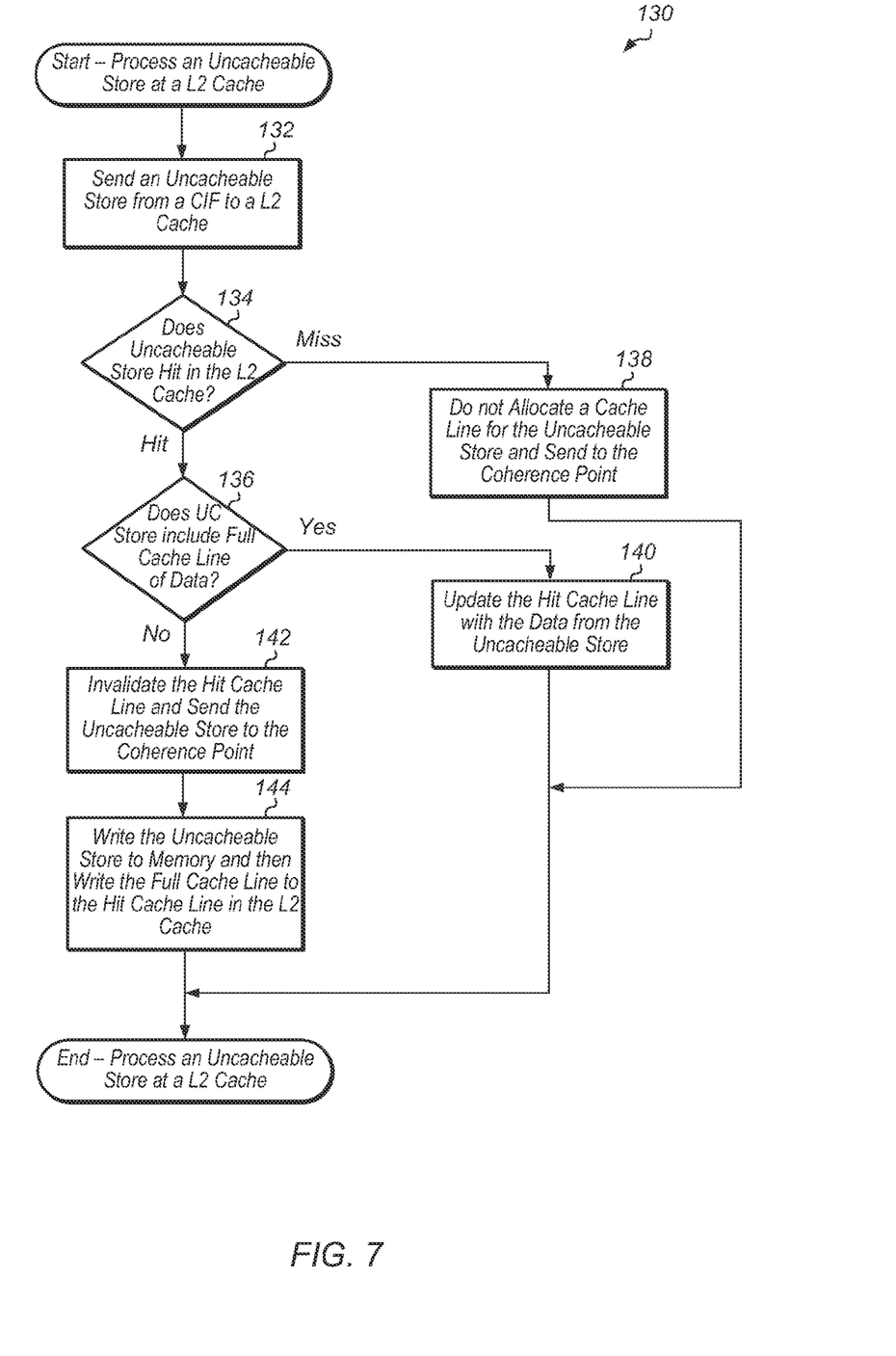
FIG. 7 is a generalized flow diagram illustrating one embodiment of a method for processing an uncacheable store at a L2 cache.

Turning now to FIG. 7, one embodiment of a method 130 for processing an uncacheable store at an L2 cache is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, an uncacheable store may be sent to a L2 cache from a core interface unit (CIF) (block 132). If the uncacheable store hits in the L2 cache (conditional block 134, "hit" leg), then it may be determined if the uncacheable store includes a full cache line of data (conditional block 136). If the uncacheable store misses in the L2 cache (conditional block 134, "miss" leg), then the L2 cache may not allocate a cache line for the uncacheable store and the uncacheable store may be sent to the coherence point (block 138). After block 138, method 130 may end.

If the uncacheable store includes a full cache line of data (conditional block 136, "yes" leg), then the hit cache line may be updated with the data from the uncacheable store (block 140). If the uncacheable store includes less than a full cache line of data (conditional block 136, "no" leg), then the hit cache line may be invalidated and the uncacheable store may be sent to the coherence point (block 142). Then, the uncacheable store may be written to memory and then the full cache line may be read from memory and written to the hit cache line in the L2 cache (block 144). After blocks 140 and 144, method 130 may end.

Figure 8:
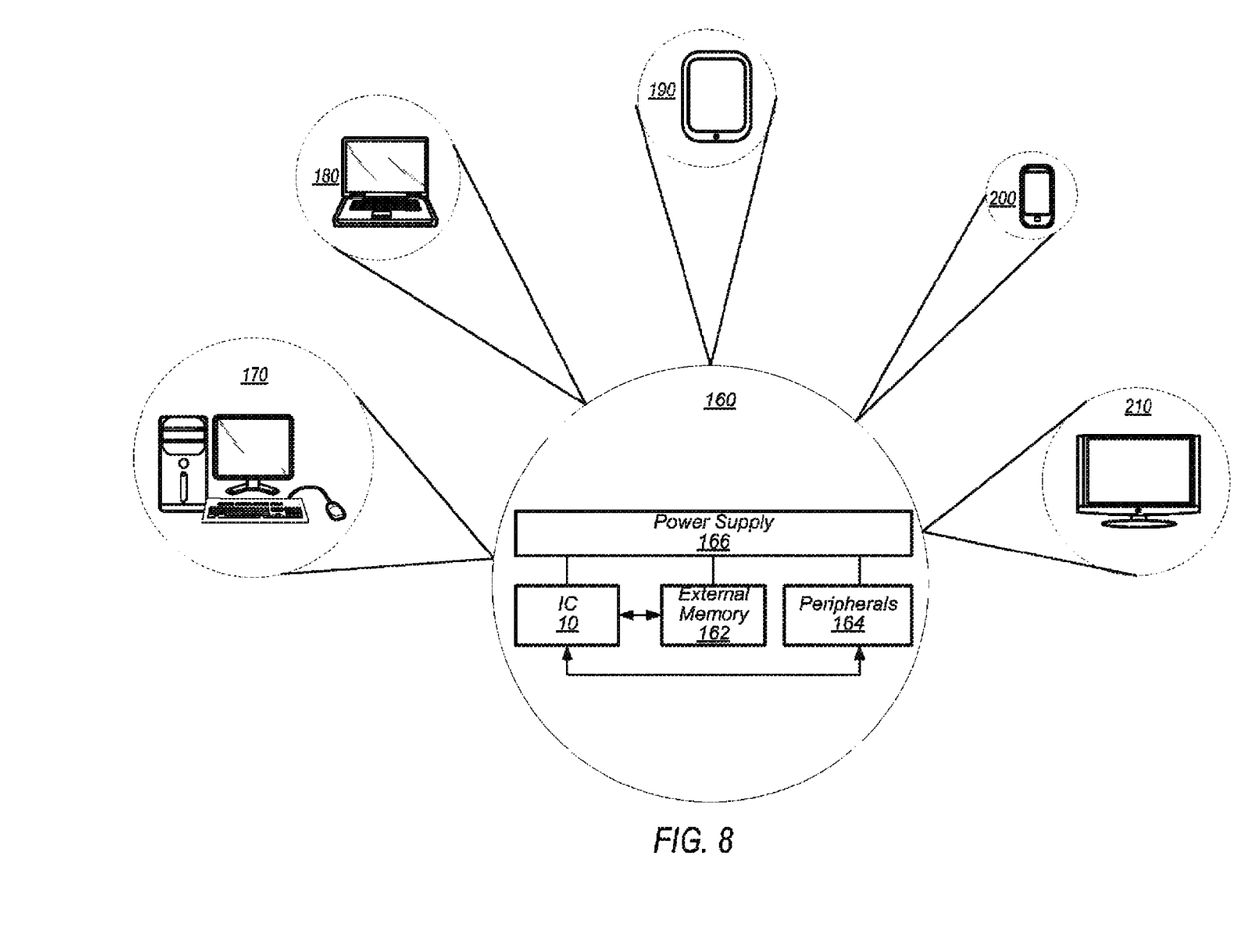
FIG. 8 is a block diagram of one embodiment of a system.

Turning next to FIG. 8, a block diagram of one embodiment of a system 160 is shown. As shown, system 160 may represent chip, circuitry, components, etc., of a desktop computer 170, laptop computer 180, tablet computer 190, cell phone 200, television 210 (or set top box configured to be coupled to a television), or otherwise. In the illustrated embodiment, the system 160 includes at least one instance of IC 10 (of FIG. 2) coupled to an external memory 162.

IC 10 is coupled to one or more peripherals 164 and the external memory 162.

A power supply 166 is also provided which supplies the supply voltages to IC 10 as well as one or more supply voltages to the memory 162 and/or the peripherals 164. In various embodiments, power supply 166 may represent a battery (e.g., a rechargeable battery in a smart phone, laptop or tablet computer). In some embodiments, more than one instance of IC 10 may be included (and more than one external memory 162 may be included as well).

The memory 162 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 10 in a chip-on-chip configuration, a package-on-package configuration, or a multichip module configuration.

The peripherals 164 may include any desired circuitry, depending on the type of system 160. For example, in one embodiment, peripherals 164 may include devices for various types of wireless communication, such as wifi, Bluetooth, cellular, global positioning system, etc. The peripherals 164 may also include additional storage, including RAM storage, solid state storage, or disk storage. The peripherals 164 may include user interface devices such as a display screen, including touch display screens or multitouch display screens, keyboard or other input devices, microphones, speakers, etc.

Figure 9:
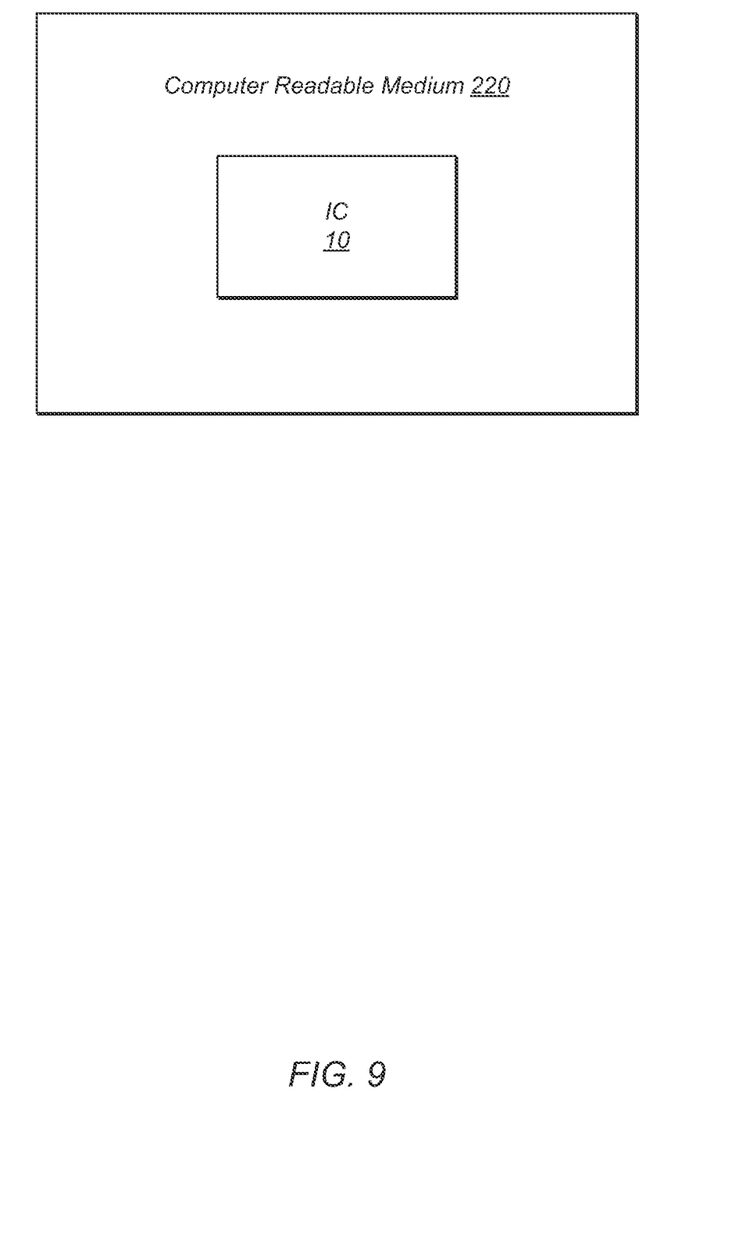
FIG. 9 is a block diagram of one embodiment of a computer readable medium.

Referring now to FIG. 9, one embodiment of a block diagram of a computer readable medium 220 including one or more data structures representative of the circuitry included in IC 10 (of FIG. 1) is shown. Generally speaking, computer readable medium 220 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 220 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL.

The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 220 may be the netlist(s) (with or without the synthesis library) or the data set(s), as desired. In yet another alternative, the data structures may comprise the output of a schematic program, or netlist(s) or data set(s) derived therefrom.

While computer readable medium 220 includes a representation of IC 10, other embodiments may include a representation of any portion or combination of portions of IC 10 (e.g., core interface unit, load/store unit).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
   one or more cores; and
   a plurality of levels of cache, wherein the plurality of levels of cache comprise a level one (L1) cache and a level two (L2) cache;
   wherein the processor is coupled to a memory, wherein an address space of the memory is partitioned into two or more regions, wherein a first region is defined as a cacheable region, wherein a second region is defined as an uncacheable region, and wherein the processor is configured to:
   allow uncacheable loads to be cached at any level of cache;
   restrict a first uncacheable load to a predetermined subset of ways of a plurality of ways of the L2 cache responsive to detecting a miss for the first uncacheable load in the L2 cache.

2. The processor as recited in claim 1, wherein the processor is further configured to update a hit cache line with data from a first uncacheable store responsive to detecting a hit for the first uncacheable store in the L1 cache.

3. The processor as recited in claim 2, wherein the processor is further configured to prevent a cache line from being allocated for the first uncacheable store in the L1 cache responsive to detecting a miss for the first uncacheable store in the L1 cache.

4. The processor as recited in claim 3, further comprising a core interface unit, wherein the processor is configured to convey the first uncacheable store to the core interface unit responsive to detecting a miss for the first uncacheable store in the L1 cache.

5. The processor as recited in claim 4, wherein the core interface unit is configured to store data from the first uncacheable store in a first buffer.

6. The processor as recited in claim 5, wherein the processor is configured to convey a second uncacheable store to the core interface unit responsive to detecting a miss for the second uncacheable store in the L1 cache, and wherein the core interface unit is configured to store data from the second uncacheable store in the first buffer.

7. The processor as recited in claim 6, wherein the core interface unit is configured to convey data from the first buffer to the L2 cache responsive to detecting that a full cache line of data is stored in the first buffer.

8. A method comprising:
   receiving an uncacheable load at a given cache of a multi-level cache hierarchy,
   wherein the multi-level cache hierarchy comprises at least a level one (L1) cache and a level two (L2) cache;

updating a hit cache line at the given cache responsive to detecting a hit for the uncacheable load at the given cache; and allocating the uncacheable load at the given cache responsive to detecting a miss for the uncacheable load at the given cache, wherein the L2 cache comprises a plurality of ways, and wherein allocation of the uncacheable load is restricted to a predetermined subset of the plurality of ways of the L2 cache responsive to detecting a miss for the uncacheable load in the L2 cache.

9. The method as recited in claim 8, further comprising:

receiving an uncacheable store at the L1 cache; and updating a respective cache line with data from the uncacheable store responsive to detecting a hit for the uncacheable store.

10. The method as recited in claim 9, further comprising preventing an uncacheable store from being allocated in the L1 cache responsive to detecting a miss for the uncacheable store.

11. The method as recited in claim 10, further comprising conveying the uncacheable store to a core interface unit responsive to detecting a miss for the uncacheable store.

12. The method as recited in claim 11, further comprising merging a plurality of contiguous uncacheable stores in a buffer in the core interface unit.

13. The method as recited in claim 12, further comprising conveying data from the buffer to the L2 cache responsive to detecting the buffer contains a full cache line of data.

14. A method comprising:

receiving a first uncacheable load at a given cache of a multi-level cache hierarchy, wherein the multi-level cache hierarchy comprises at least a level one (L1) cache and a level two (L2) cache;

allocating the first uncacheable load in the given cache responsive to detecting a miss for the first uncacheable load;

receiving a first uncacheable store at the given cache; and preventing data from the first uncacheable store from being allocated in the given cache responsive to detecting a miss for the first uncacheable store, wherein the given cache is a level two (L2) cache, and wherein allocation of the first uncacheable load is restricted to a predetermined subset of the plurality of ways of the L2 cache responsive to detecting a miss for the first uncacheable load in the L2 cache.

15. The method as recited in claim 14, further comprising updating a hit cache line with data from the first uncacheable store responsive to detecting a hit for the first uncacheable store in the given cache.

16. A system on chip (SoC) comprising a processor complex, wherein the processor complex comprises a multi-level cache hierarchy, and wherein the processor complex is configured to:

receive an uncacheable load at a given cache of the multi-level cache hierarchy, wherein the multi-level cache hierarchy comprises at least a level one (L1) cache and a level two (L2) cache;

update a hit cache line at the given cache responsive to detecting a hit for the uncacheable load at the given cache; and allocate the uncacheable load at the given cache responsive to detecting a miss for the uncacheable load at the given cache;

wherein the L2 cache comprises a plurality of ways, and wherein allocation of the uncacheable load is restricted to a predetermined subset of the plurality of ways of the L2 cache responsive to detecting a miss for the uncacheable load in the L2 cache.

17. The SoC as recited in claim 16, wherein the processor complex comprises a core interface unit, and wherein the processor complex is further configured to convey a received uncacheable store to the core interface unit responsive to detecting a miss for the uncacheable store in the L1 cache.

18. The SoC as recited in claim 17, wherein the core interface unit is configured to store data from the uncacheable store in a given buffer.

19. The SoC as recited in claim 18, wherein the core interface unit is further configured to merge data from a plurality of uncacheable stores in the given buffer.

20. The SoC as recited in claim 19, wherein the core interface unit is further configured to send data from the buffer to a level two (L2) cache responsive to detecting the buffer contains a full cache line of data.

\* \* \* \* \*